Oct. 30, 1962 R. L. WURGAFT 3,060,984
FRUIT JUICING MACHINE
Original Filed July 7, 1958 3 Sheets-Sheet 1
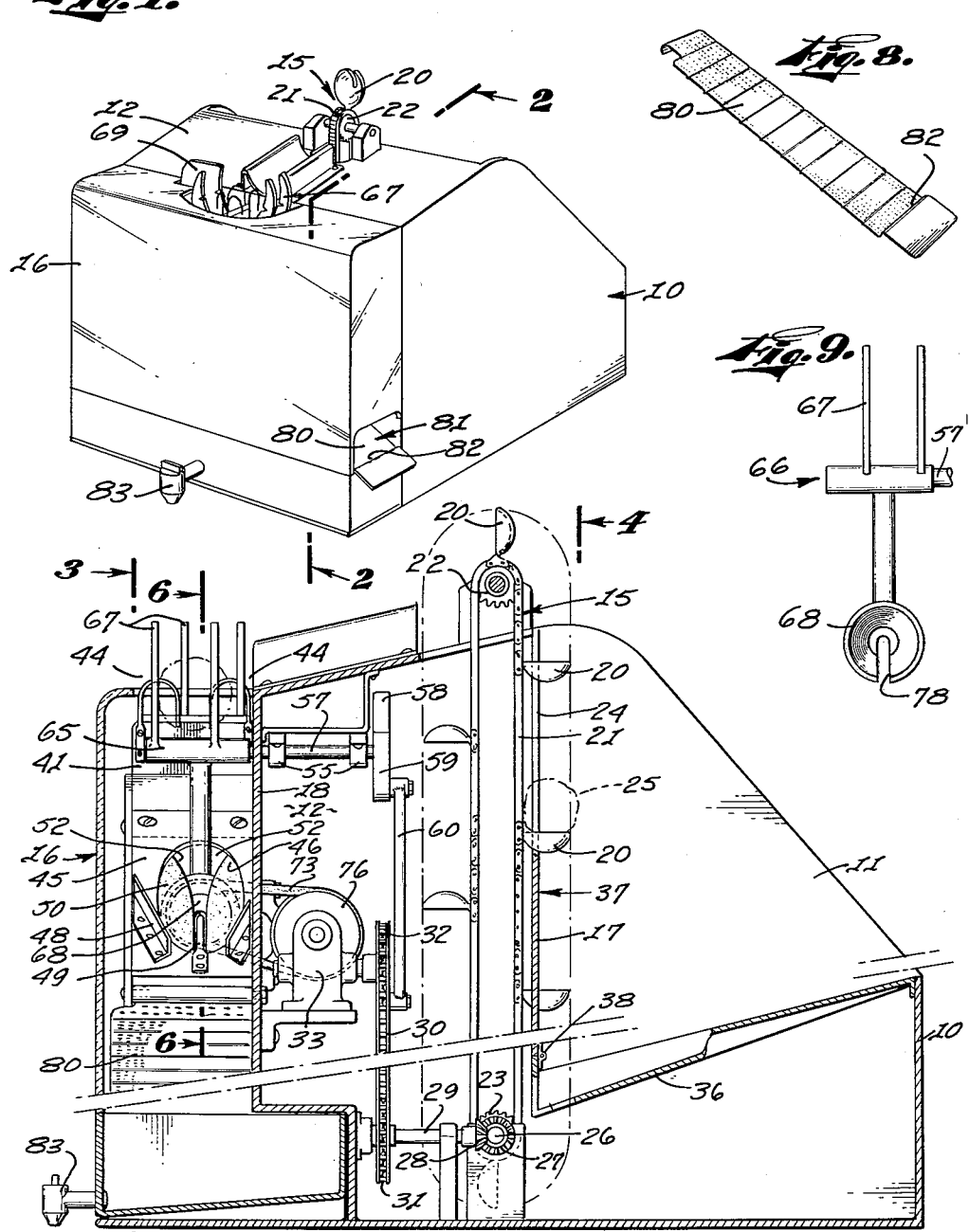
INVENTOR.
ROBERT L. WURGAFT
BY
AGENT

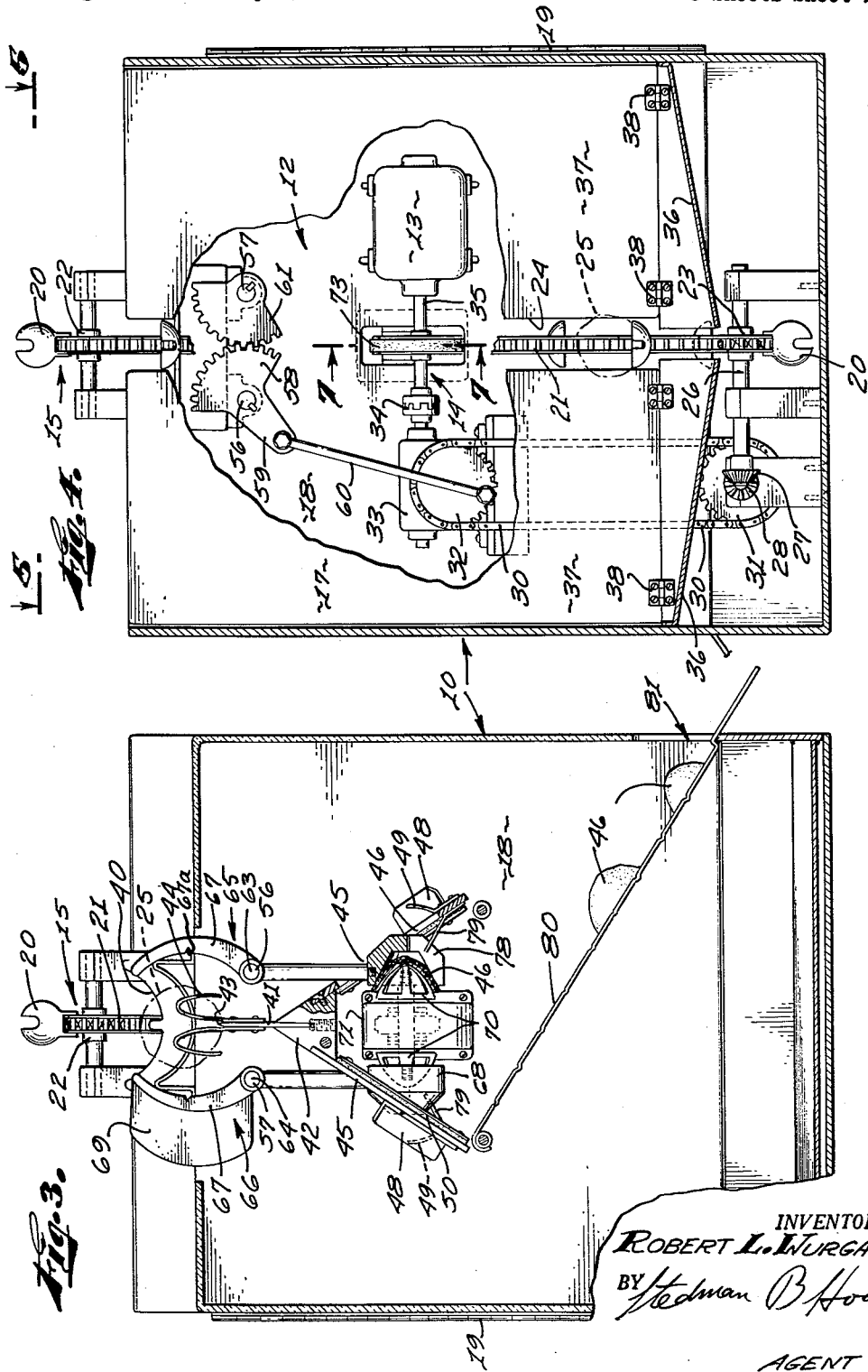

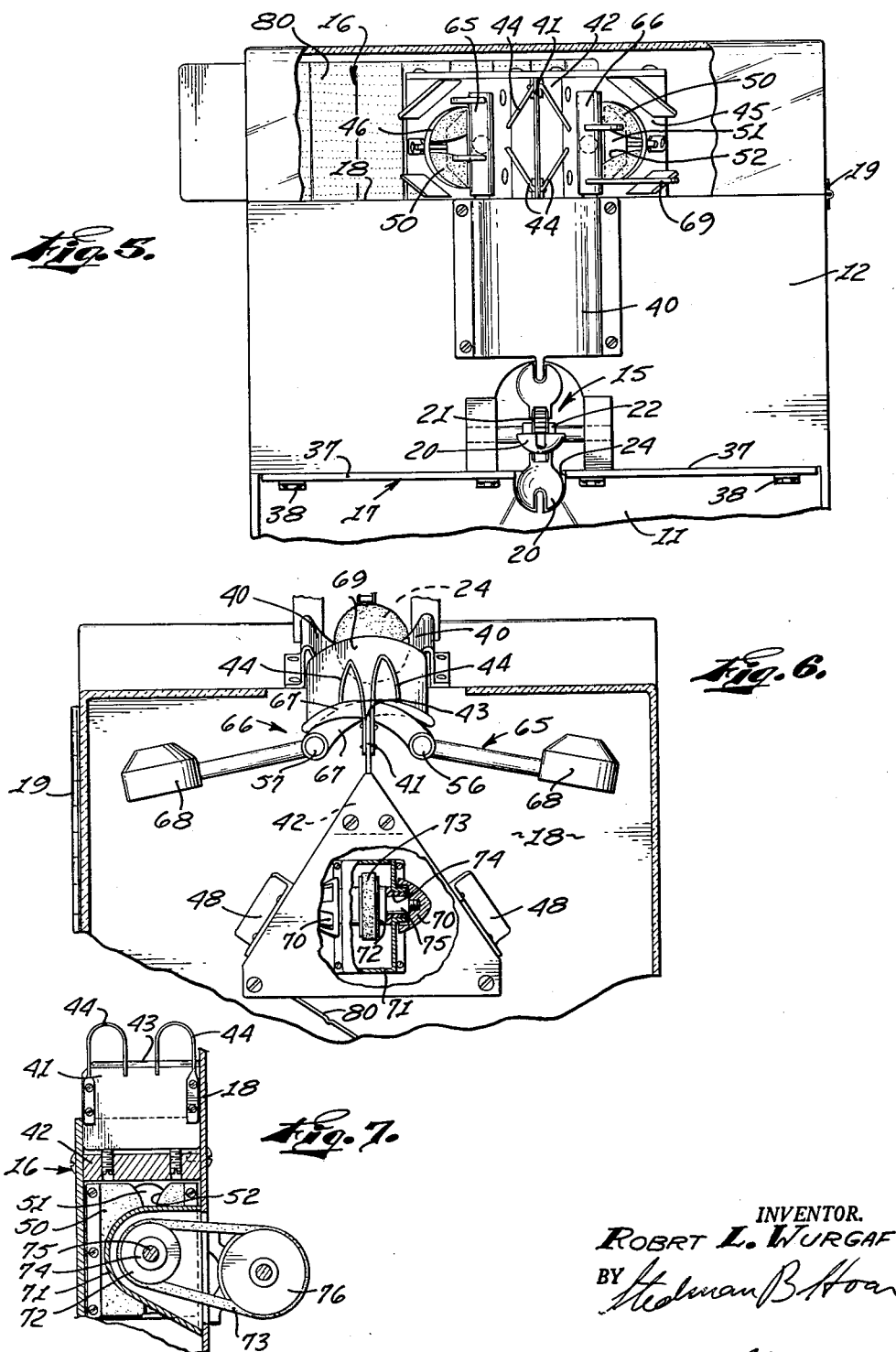

United States Patent Office
3,060,984
Patented Oct. 30, 1962

3,060,984
FRUIT JUICING MACHINE
Robert L. Wurgaft, Anaheim, Calif., assignor to Citrus Equipment Corporation, Whittier, Calif., a corporation of California
Continuation of application Ser. No. 746,930, July 7, 1958. This application July 5, 1960, Ser. No. 40,968
7 Claims. (Cl. 146—3)

This invention relates to machines for extracting juice by pressure from fruit and more particularly relates to a machine for extracting juice from citrus fruit. This is a continuation of my copending application Serial Number 746,930, filed July 7, 1958, now abandoned, on Fruit Juicing Machine.

Although a large business in selling orange juice is conducted by road-side stands, few such stands squeeze the juice while the purchaser watches. The purchaser consequently is left in doubt as to how fresh the juice is. This lax merchandising is, in my opinion, necessitated by time and economy. The stand operator is often alone; an automobile full of people often presents three to six customers at one instant, and it is well known that one car or one truck draws others; the operator simply cannot give the time to pushing oranges through a machine, nor can he or she afford an assistant. There are numerous fully automatic juicing machines for large scale commercial operations, but these are not at all suited to squeezing two or twenty oranges at a time and then stopping. The stand operator must squeeze before customers arrive and let potential customers speculate as to freshness.

It is accordingly an object of my invention to provide a fruit-juicing machine which is fully automatic, which is of such small size as to easily be set on a table or service counter or even be moved around and which may economically extract juice from any number of oranges, from one upward.

It is another object of my invention to provide a citrus juicer into which the operator may throw a number of oranges, perhaps even selected by the customer, and the customer may see these same oranges appear one by one, sliced, juiced and the juice appear in a glass, while the stand operator is busy with other parts of an order.

A further object of my invention is to provide a citrus juicer which, while primarily intended for small commercial operations, is yet suitable for either family use or for great hotels.

It is specifically an object of my invention to provide a citrus juicer which, once set in motion, need not be watched or tended and which is both economic and rapid.

Further objects and advantages of my citrus juicer will be pointed out as this description proceeds, or will be apparent from the specification taken in conjunction with the accompanying drawings, in which:

FIGURE 1 is a perspective view of a complete citrus juicer, according to my invention, showing the machine as it might appear on a roat-side stand counter;

FIGURE 2 is a vertical sectional view on the line 2—2 of FIGURE 1 and on an enlarged scale;

FIGURE 3 is a vertical sectional view on the line 3—3 of FIGURE 2, at right angles to the view of FIGURE 2 and looking toward the rear of the machine, showing pressure fingers in position to grasp an orange;

FIGURE 4 is another vertical sectional view at right angles to the view of FIGURE 2 taken on the line 4—4 of FIGURE 2 and looking toward the front of the machine with cover parts broken away to show interior mechanism;

FIGURE 5 is a fragmentary top plan view as indicated by the line 5—5 of FIGURE 4;

FIGURE 6 is a fragmentary vertical sectional view similar in aspect to FIGURE 3, but on the line 6—6 of FIGURE 2 and showing the pressure fingers in the position of having finished slicing an orange;

FIGURE 7 is a vertical sectional view on the line 7—7 of FIGURE 4 showing details of the driving means for burr-heads for juicing;

FIGURE 8 is a perspective detail of screening means for separating juice and pulp; and FIGURE 9 shows one of the swinging arms of the machine.

Having reference now to the details of the drawing, my improved fruit-juicing machine may be contained in a box 10, the rearward part of which is a bin 11 holding a supply of fruit, the central part 12 containing a motor 13 and driving mechanism 14 and also a conveyor 15 for lifting the fruit, and the forward part 16 containing juice-extracting mechanism. Partitions 17 and 18 respectively divide the bin 11 from the central part 12, and the central part 12 from the juicing compartment 16, and thus facilitate keeping the box 10 as a whole in a sanitary condition. A door (not shown) mounted on hinges 19 admits to the interior of the compartments 12 and 16.

The conveyor 15 has cups 20 mounted on a chain 21 which runs around sprockets 22 and 23. The cups 20 extend through a slot 24 in the partition 17 into the bin 11 where they may pick up fruit such as oranges 25. The drive shaft 26 of the lower sprocket 23 has mounted on it a bevel gear 27 which is driven by another bevel gear 28. The shaft 29 on which the bevel gear 28 is mounted is in turn driven by a chain 30 mounted on sprockets 31 and 32. The sprocket 32 is driven by a reduction gear 33, aligning clutch 34 and shaft 35 from the motor 13. The bottom 36 of the bin 11 is sloped to cause oranges or other fruit to roll to the conveyor 15, and access from the lower part of the bin 11 to the lower part of the central compartment 12 may be had through doors 37 which hang on hinges 38.

The cups 20 of the conveyor 15 discharge fruit into an inclined chute 40. Mounted below the lower end of the chute 40 is a knife 41 mounted in a triangular holding block 42 and having its cutting edge 43 upward so as to split fruit coming to it from the chute 40. Secured to the ends of the knife 41 below the edge 43 are bow springs 44. An orange 25 rolling from the chute 40 will land on the cutting edge 43 and will be held there by the bow springs 44, each of which engages the orange at two spaced positions and thus prevents the orange toppling from the knife.

Secured to the sides of the block 42 are aprons 45 on which the halves 46 of split fruit slide by gravity to burring stations. The aprons 45 have openings 47 large enough to permit passage of a fruit half. At the base of the openings 47 are retaining plates 48 secured to the aprons 45 in the form of open-bottomed V's for holding fruit that has slid down the aprons. The V-form of the retaining plates 48 insures that the fruit halves will be accurately centered upon the openings 47; to make certain that halves of small fruit do not escape, additional supporting fingers 49 may be disposed between the plates 48. The openings 47 are partially closed by elastic closures 50 attached to the under or inner sides of the aprons 45 which are split down the center to create openings 51 smaller than the openings 47 so that the edges 52 of the openings 51 are stretched like curtain drapes across a window. The elastic closures 50 have enough strength to hold a fruit half 46 from tumbling through an opening 47, but nevertheless will yield and spread open to permit a fruit half to be pushed through the opening.

Secured in bearings 55 to the top of the central compartment are two shafts 56 and 57. The shaft 56 has secured to it a gear sector 58 with lever arm 59 and the lever arm 59 is connected to the sprocket 32 by a connecting rod 60 arranged so that rotation of the sprocket 32 causes oscillation of the gear sector 58. Meshing with the gear sector 58 is another gear sector 61 mounted on the shaft 57.

The shafts 56 and 57 thus caused to oscillate by their respective gear sectors 58 and 61 extend through the partition 18 into the forward compartment 16 on each side of the knife 41 and just below the cutting edge 43 of the knife where they form the pivot points 63 and 64 for arms 65 and 66. The arms 65 and 66 spaced apart at their pivot points 63 and 64 have curved fingers 67 at their upper ends and cups 68 at their lower ends. From a substantially vertical position of the arms 65 and 66 the fingers 67 are arranged to swing convergently and then downwardly and to interlace as they converge. At the same instant the cups 68 swing divergently and then upwardly. The fingers 67 will converge upon a fruit 25 held upon the knife edge 43 by the bow springs 44 and by then forcing the fruit downward upon the knife, will cause the fruit to split and its halves 46 to release from the fingers and to slide down the aprons 45 to the retaining plates 48 and supporting fingers 49.

That one of the fingers 67 nearest the chute 40 carries upon its back a sheet metal gate 69 which is brought across the end of the chute 40 to close the chute by the converging and downward movement of the fingers pressing a fruit against the knife and which is swung upward and away from the chute 40 by the upward and divergent swinging of the fingers 67 to then permit another fruit to fall from the chute. All the fingers 67 have notches 67a which the knife edge may enter to cut the last bit of rind.

The arms 65 and 66 extend downward from the pivot points 63 and 64 so that the arcs through which the cups 68 swing are aligned with the opening 47 and 51. The cups 68 are designed and arranged to engage the fruit halves 46 which have been caught by the retaining plates 48 and support fingers 49 and to push the fruit halves through the openings 51 in the elastic closures 50 against reamers or burr-heads 70, as best shown in FIGURE 3. The burr-heads 70 are arranged back to back extending outwardly from a splash-guard 71. The splash-guard 71 protects a pulley 72 and belt 73 from juices extracted by the burr-heads 70 and also protects the bearings 74 of the shaft 75 on which the burr-heads 70 and pulley 72 are mounted and which may suitably be mounted in the splash-guard 71. The belt 73 is driven from a pulley 76 on the shaft 35 of the motor 13.

It will be seen the swinging arms 65 and 66 successively cause a fruit to be sliced and then to be juiced. The cups 68 swing downwardly and then swing convergently so that they may bring the fruit halves 46 to the burr-heads 70 in a horizontal movement and may swing away from the burr-heads in the reverse horizontal movement which assists them in disposing of the rinds. For this purpose the cups 68 are provided with slots 78 through which leaf springs 79 may pass. The springs 79 are bent down by contact with the fruit halves 46 as the cups 68 swing convergently, but spring up when the cups have passed them and again make contact with the rinds held by the cups as the cups swing outwardly. The rinds are thus knocked from the cups 68 and fall upon peel slides 80, down which they slide to exit ports 81 where they may be collected. The support fingers 49 also pass through the slots 78. The peel slides 80 are provided with a multiplicity of perforations 81 which permit the juice to drain through to a catch basin 82 from which it can be removed through a pet-cock 83. A certain amount of pulp will fall upon the slides 80 and the constant wiping by the sliding peels helps to drain the pulp and adds to the recovery of juice.

Since the cups 20 on the conveyor 15 may be spaced so that their deposit of fruit in the chute 40 coincides with one complete oscillation of the swinging arm 65 and 66, it is imposisble to over-feed my improved juicing machine. Any suitable timing device may be added to the machine by which the motor 13 runs while a predetermined number of fruits are juiced or the motor may be governed by a float control in the catch basin 82.

The disclosed embodiment is not to be construed as a limitation upon my invention the scope of which is deemed to include any desirable constructive modification within the spirit and breadth of the appended claims.

I claim:

1. In a fruit-juicing machine: a frame, a pair of spaced arms; fingers on one end of each of said arms for grasping a fruit; cups on the other ends of said arms for grasping, each, a half fruit; means on said frame between said fingers and said cups for pivotally connecting said arms to said frame; means operably connected to said arms for causing oscillating swinging movement of said arms about said pivot means; a knife blade disposed on said frame to split a fruit pressed thereagainst by said fingers; and burr heads disposed on said frame to ream split portions of fruit pressed thereagainst by said cups.

2. In a fruit-juicing machine: a frame, a pair of spaced arms pivotally mounted on said frame adjacent their mid-points for alternately swinging their like ends convergently; means on said frame for causing oscillating swinging movement of said arms; a knife blade on said frame; fingers on one end of each of said arms for grasping a fruit and pressing said fruit against said knife blade to split said fruit; cups on the other ends of said arms for grasping, each, a half fruit; means on said frame aligned with the arcs through which said cups swing for catching and holding half fruit portions so that said swinging cups may grasp said portions; and burr heads on said frame aligned with said arcs for reaming half fruit portions grasped by said swinging cups.

3. In a fruit-juicing machine: a frame, a pair of spaced arms having generally upper and lower ends and movable in the same vertical plane and pivoted adjacent their mid-points to said frame for alternately swinging their respective upper ends convergently and downwardly and their respective lower ends downwardly and convergently; means operably connected to said arms for imparting oscillating swinging movement to said arms; a knife blade on said frame between and below said upper arm ends; fingers on said upper arm ends arranged for cooperatively grasping a fruit and by said swinging movement pressing said fruit downward upon said knife blade to split said fruit; burr heads on said frame aligned with the arcs through which said lower arm ends swing; and cups on said lower arm ends for grasping split portions of fruit and swinging said split portions against said burr heads.

4. In a fruit-juicing machine: a frame, a pair of spaced arms having pivot points on said frame adjacent their mid-points for swinging in the same vertical plane and having like ends swinging convergently and downwardly above said pivot points and other like ends swinging downwardly and convergently below said pivot points; means operably connected to said arms for imparting oscillating swinging movement to said arms; fingers on sadi first-mentioned ends, said fingers on one of said arms being arranged to interlace with said fingers of the other of said arms when said first-mentioned ends converge so as then to grasp a fruit and press said fruit downward; a knife blade on said frame between and below said first-mentioned ends upon which said fingers may press said fruit to split said fruit; aprons on said frame below said knife blade diverging downwardly upon which split portions of said fruit may slide; cups on said last-mentioned arm ends adapted to grasp said split portions of fruit; burrs on said frame aligned with the arcs through which said cups are swung; said aprons having openings aligned with said burrs and said cups through which said cups may swing said split portions of fruit against said burrs; and means for arresting and holding said split portions of fruit opposite to said openings until said cups grasp said portions.

5. In a fruit-juicing machine: a frame, an arm, means adjacent one end of said arm for contacting a fruit, a cup adjacent the other end of said arm for grasping a half fruit; means on said frame between said contacting means and said cup for pivotally connecting said arm to said frame, means operably connected to said arm for causing swinging movement of said arm about said pivot means, a knife blade on said frame disposed to split a fruit pressed thereagainst by said contacting means, and a reamer on said frame disposed to ream split portions of fruit pressed thereagainst by said cup.

6. The machine of claim 5 including means aligned with the arc through which said cup swings for catching and holding half fruit portions so that said swinging cup may grasp said portions.

7. In a fruit-juicing machine: a frame, a pair of spaced arms having generally upper and lower ends and movable in the same vertical plane and pivoted adjacent their mid-points to said frame for alternately swinging their respective upper ends convergently and downwardly and their respective lower ends downwardly and convergently; means operably connected to said arms for imparting oscillating swinging movement to said arms; a knife blade on said frame between and below said upper arm ends; means on said upper arm ends arranged for cooperatively contacting a fruit and by said swinging movement pressing said fruit downward upon said knife blade to split said fruit; burr heads on said frame aligned with the arcs through which said lower arm ends swing; and cups on said lower arm ends for grasping split portions of fruit and swinging said split portions against said burr heads.

References Cited in the file of this patent
UNITED STATES PATENTS

| | | |
|---|---|---|
| 1,620,551 | Hughes | Mar. 8, 1927 |
| 2,737,989 | Wurgaft | Mar. 13, 1956 |
| 2,853,107 | Alexander | Sept. 23, 1958 |